May 13, 1924.
F. BROWN
PNEUMATIC INCLINE
Filed July 13, 1923
1,493,729
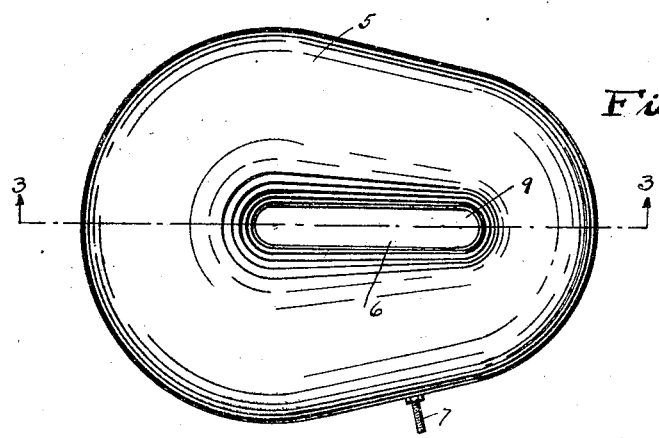
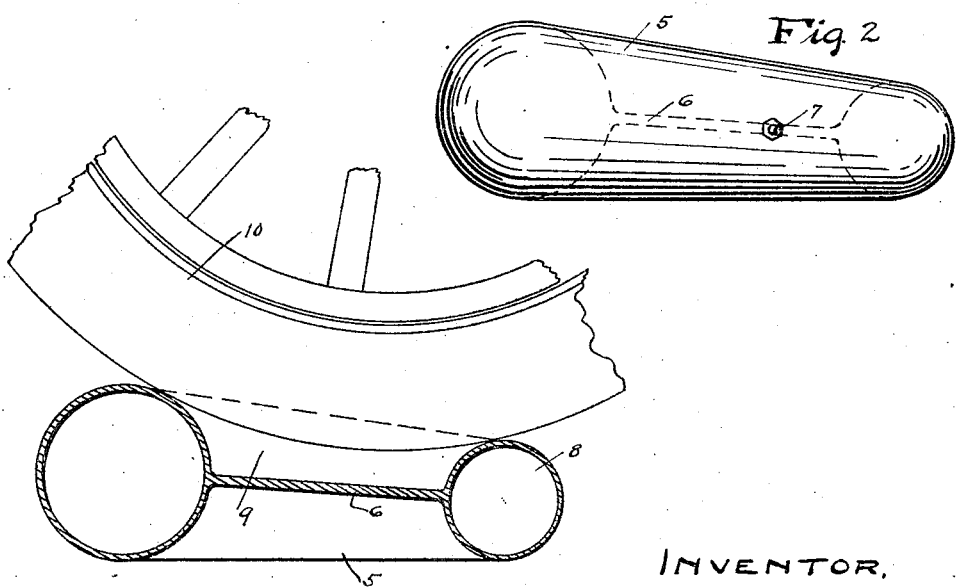
INVENTOR,
FRANK BROWN,
By Joseph A. Minturn.
Attorney.

Patented May 13, 1924.

1,493,729

UNITED STATES PATENT OFFICE.

FRANK BROWN, OF INDIANAPOLIS, INDIANA.

PNEUMATIC INCLINE.

Application filed July 13, 1923. Serial No. 651,385.

*To all whom it may concern:*

Be it known that I, FRANK BROWN, a citizen of the United States, residing at Indianapolis, in the county of Marion and State of Indiana, have invented new and useful Improvements in Pneumatic Inclines, of which the following is a specification.

My invention relates to means of elevating a motor driven car, one wheel at a time if desired, for the purpose of removing a wheel or the removing or replacing of the pneumatic tire on the wheel; and it is the object of my invention to provide such means of elevation that will eliminate the operation of the customary lifting-jack. In many of the motor driven cars, due to bumpers or fenders placed thereon or to the overhang of the body, it is found necessary for the car operator to crawl under the car to place the usual jack in position under the car axle. It is the further object of my invention to eliminate such inconvenience.

I attain these and other objects as may hereinafter appear, by the means as illustrated in the accompanying drawing, in which—

Fig. 1, is a plan view of my pneumatic incline; Fig. 2, a side elevation; and Fig. 3, a vertical section taken on the line 3—3 of Fig. 1.

Like characters of reference represent like parts throughout the several views.

I form a continuous tube 5 in an ovoid shape, Fig. 1, by making the diameter of the tube 5 smaller on the one end than the diameter on the opposite end, Fig. 3. The walls of the tube 5 are made of some such material, as combined rubber and fabric, as will confine air and as will not be distended appreciably by the necessary internal air pressure.

A central web 6, made of the same material as the side walls of the tube 5, is provided to maintain the ovoid shape of the tube 5, when under external pressure. An air-valve 7 of the usual and well known construction as used in pneumatic tubes for vehicles in general, is secured at any suitable point in the outer wall of the tube 5 as in Fig. 1.

In using my pneumatic incline, taking the case of a deflated tire on a motor driven car as an example, I inflate the tube 5 with air through the valve 7 to a pressure of 60 pounds or more depending upon the weight of the motor driven car. The incline is placed on the ground against the wheel of the car, with the thinner or small end 8, Fig. 3, in contact with the wheel and the central recess 9 parallel with the wheel. The car is then moved to bring the wheel onto the incline such that the wheel drops into the recess 9, as indicated by the fragment of a wheel 10, Fig. 3.

By making the diameters of the tube 5 greater, the wheel of the car may be lifted higher from the ground, and different degrees of elevation may be secured by varying the air pressure in the tube 5.

Any obtainable block is placed under the axle of the car carrying the wheel in question and the valve 7 is allowed to release the air confined in the tube 5. The incline may then be withdrawn from under the wheel, which will have sufficient clearance to permit the removal of the tire on the wheel for the necessary repairs, and the replacing of the inflated tire.

To lower the car, the car may be moved so as to drop off the block used under the axle, or the deflated incline may be placed under the wheel; then inflated, and thus raise the wheel; permit the removal of the block; and allow the car to move as the wheel rolls down off the incline.

Having described my invention as embodied in the form now best known to me what I claim is—

1. The combination in a pneumatic incline, of a gas containing receptacle capable of being inflated and deflated and formed of a continuous encircling tube, said tube having an upper surface non-parallel with the lower surface; with a central recess in said receptacle; and a valve attached to said receptacle.

2. In a pneumatic incline, the combination of a gas containing receptacle capable of being inflated and deflated and formed of a continuous encircling tube; an upper surface of said tube being non-parallel with the lower surface; with a central web; a central recess in said receptacle; and a valve attached to said receptacle.

Signed at Indianapolis, Indiana, this the 9th day of July, 1923.

FRANK BROWN.